Sept. 8, 1931.  F. M. McCLURE  1,822,598
MATERIAL LOADING APPARATUS
Filed Nov. 22, 1926    3 Sheets-Sheet 1
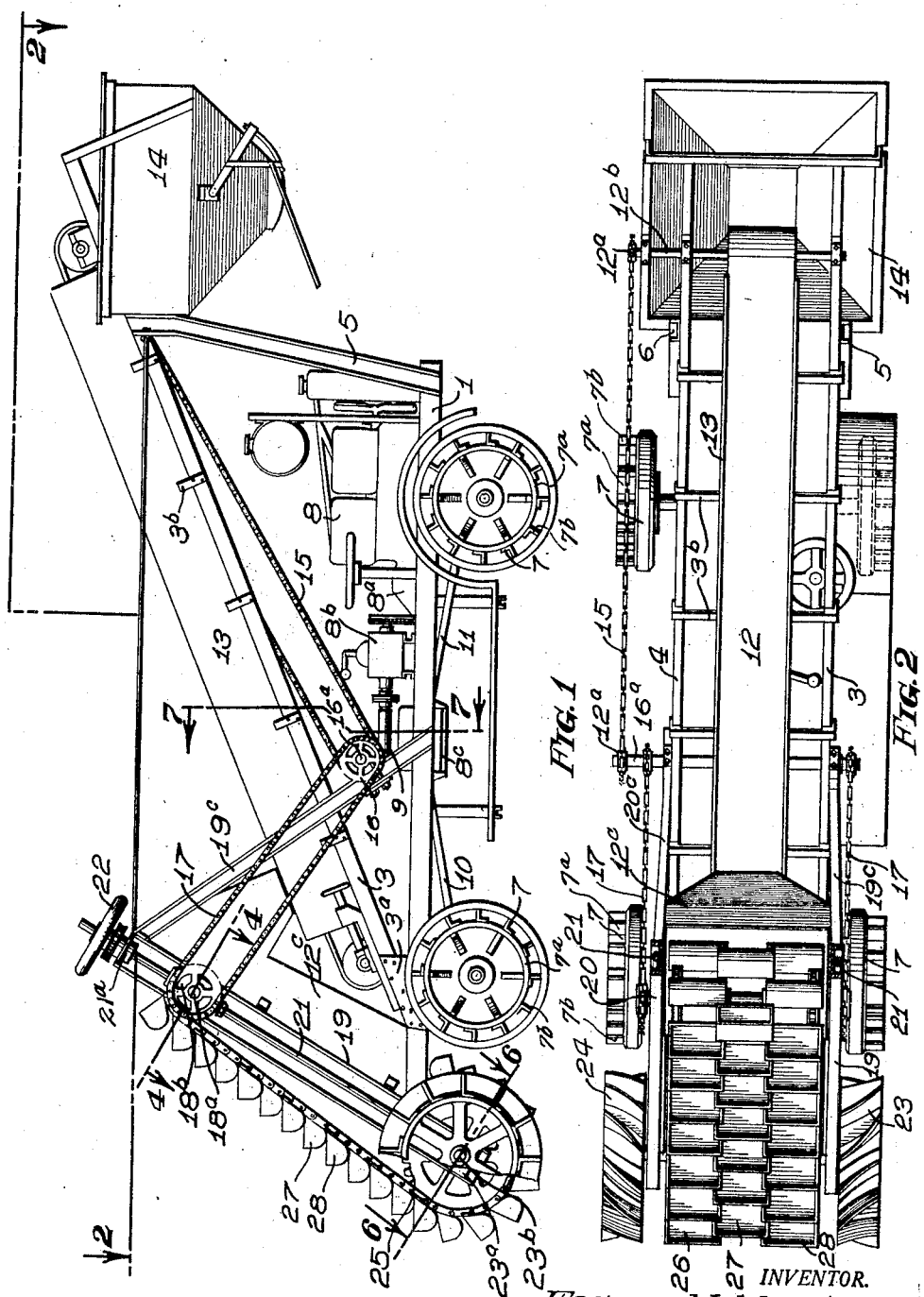
INVENTOR.
FOSTER M. MC. CLURE
BY A. B. Bowman
ATTORNEY Sept. 8, 1931.  F. M. McCLURE  1,822,598
MATERIAL LOADING APPARATUS
Filed Nov. 22, 1926   3 Sheets-Sheet 2
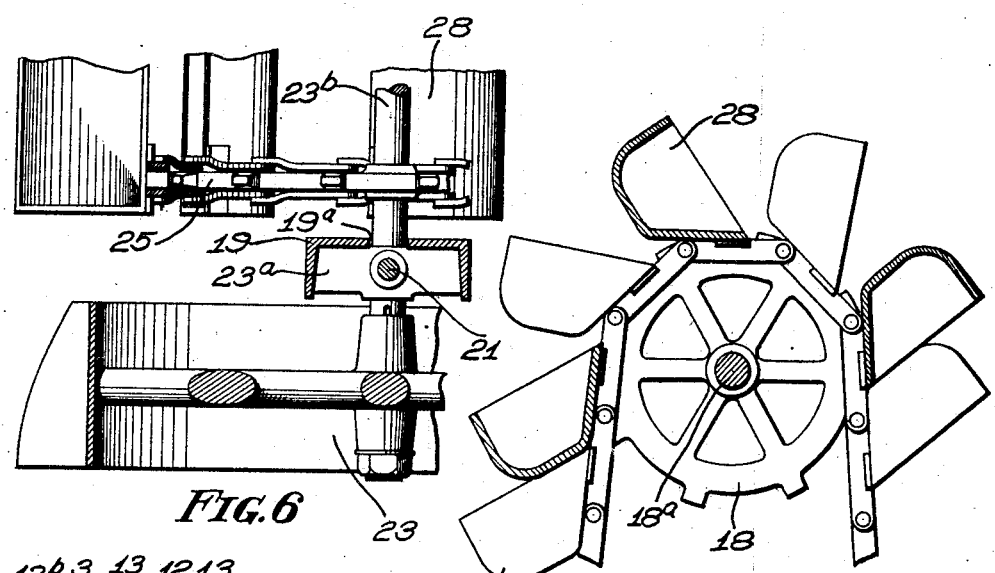
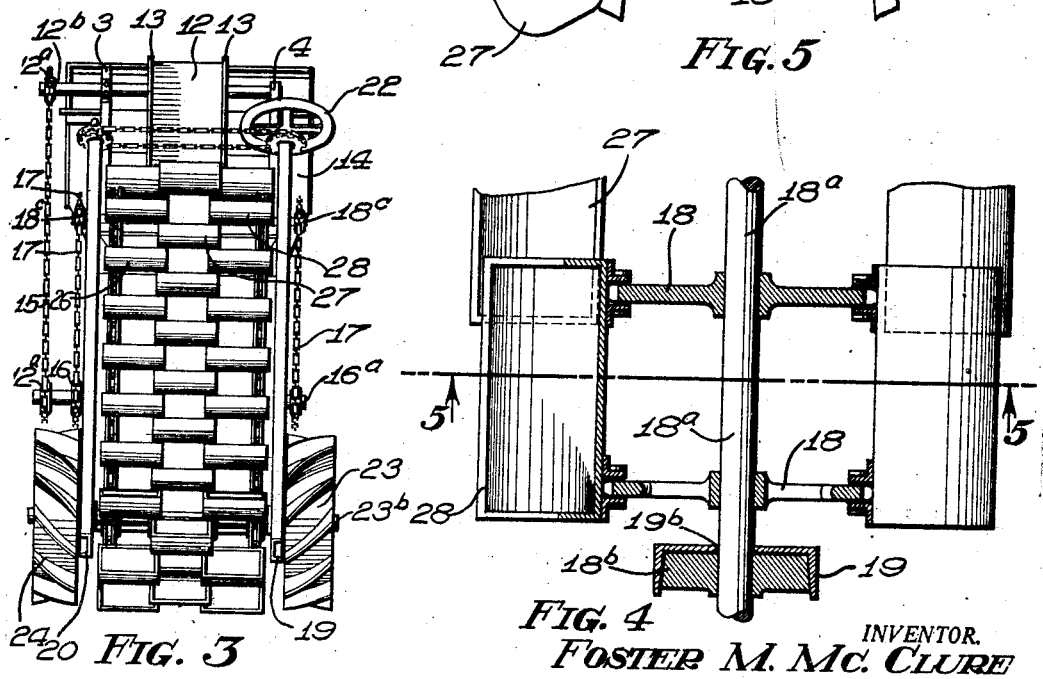
INVENTOR.
FOSTER M. MC. CLURE
BY A. B. Bowman
ATTORNEY

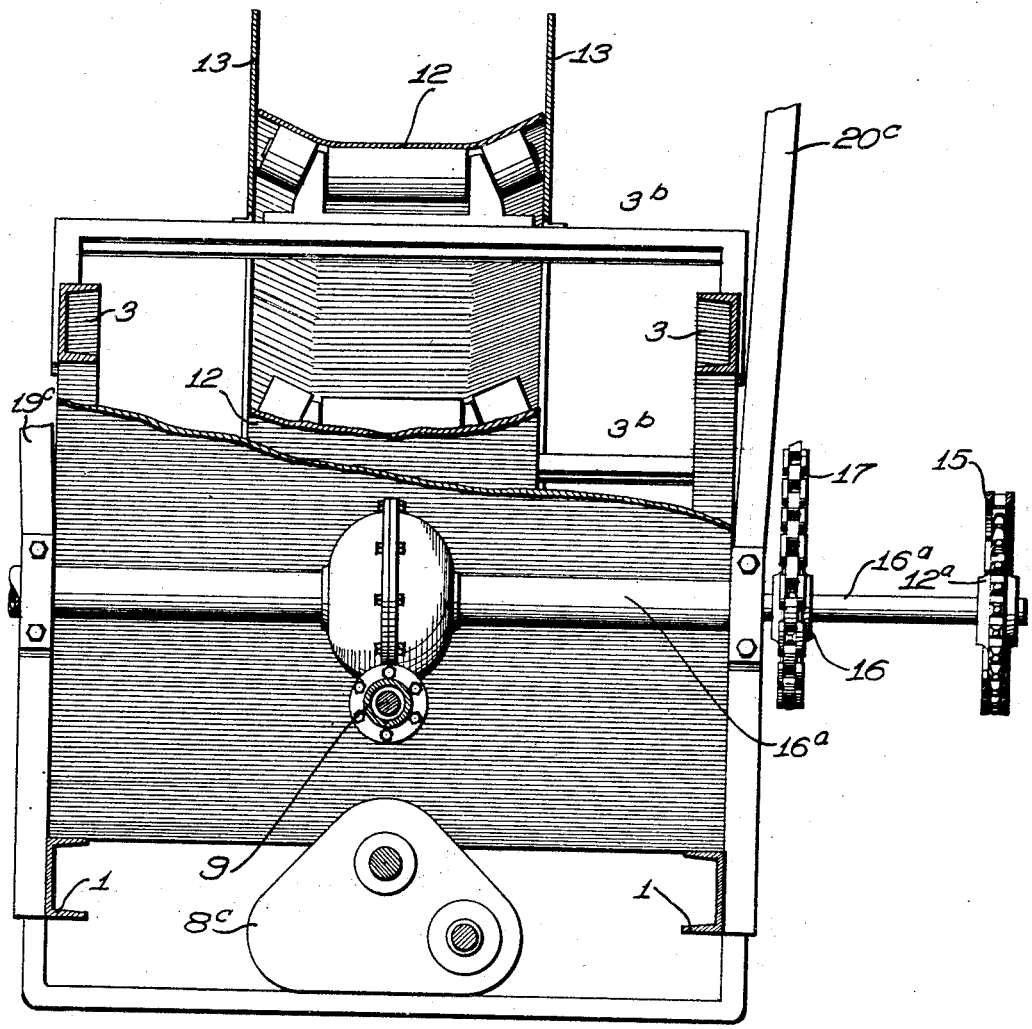

Patented Sept. 8, 1931

1,822,598

UNITED STATES PATENT OFFICE

FOSTER M. McCLURE, OF SAN DIEGO, CALIFORNIA

MATERIAL LOADING APPARATUS

Application filed November 22, 1926. Serial No. 149,882.

My invention relates to an apparatus for handling dirt, rocks and other materials in excavations, grading, such as road and street grading, and the like, and the objects of my invention are: first, to provide a unitary apparatus which will pick up material from a winrow and deliver it into a storage hopper from which it may be emptied into wagons, trucks, vehicles or any objects desired; second, to provide an apparatus of this class with a plurality of rows of pickup, elevating and conveyer buckets positioned adjacent to each other so that a broad swath may be made with one operation of the apparatus; third, to provide an apparatus of this class in which the positions of the bucket conveyers are readily adjusted so that they may be raised and lowered for varying conditions; fourth, to provide an apparatus of this class which may be moved from place to place on its own power and the digging portion may be raised sufficiently to give ample clearance for varying road conditions; fifth, to provide an apparatus of this class in which the material is elevated a considerable distance, then emptied into another conveyer and the other conveyer conducts the material into a storage hopper; sixth, to provide an apparatus of this class with cleaner wheels on the front sides at opposite sides of the trains of bucket conveyers for tending to shift the material inwardly toward the conveyers and also clean the pathway for the traction wheels of the apparatus; seventh, to provide an apparatus of this class which may operate continuously because the wagons and trucks or other vehicles may be loaded from the storage hopper so that the apparatus does not need to be stopped between each loading operation; eighth, to provide an apparatus of this class with novel pickup and conveyer apparatus; ninth, to provide an apparatus of this class in which the various conveyers and hopper are all mounted on one unitary frame, which is portable and operated by a single prime mover, which drives the apparatus as well as the various conveyer parts at varying relative speeds as desired; tenth, to provide an apparatus of this class in which the sprockets for the bucket conveyers are relatively larger at their lower ends than at their upper ends, thus providing for great pickup advantage at the lower end and for quick relief and turn-over at the upper end of the conveyer; eleventh, to provide an apparatus of this class in which the storage hopper is of sufficient height so that wagons or trucks may be readily driven thereunder for receiving a load while the apparatus is picking up material; twelfth, to provide an apparatus of this class in which the bucket chain supporting apparatus is adjustable for taking up the slack in the chains, for raising the chains and buckets relative to the apparatus complete and for shifting the same; thirteenth, to provide an apparatus of this class in which the main apparatus is operated upon rubber tired wheels which are provided with extension traction members for use in soft dirt, mud and the like, and fourteenth, to provide an apparatus of this class which is simple and economical of construction, efficient, durable, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of my apparatus complete, showing some of the parts and portions broken away to facilitate the illustration; Fig. 2 is a top or plan view thereof, showing a portion in section through the line 2—2 of Fig. 1; Fig. 3 is a front elevational view of the apparatus; Fig. 4 is an enlarged sectional view through 4—4 of Fig. 1; Fig. 5 is a sectional view through 5—5 of Fig. 4; Fig. 6 is a fragmentary sectional view on an enlarged scale through 6—6 of Fig. 1, and Fig. 7 is an enlarged sectional view through 7—7 of Fig. 1.

Like characters of reference refer to similar parts and portions throughout the several views of the drawings.

The horizontal frame members 1 and 2, angular conveyer frame members 3 and 4, strut braces 5 and 6, main traction and supporting wheels 7, engine 8, intermediate shaft 9, drive shafts 10 and 11, conveyer belt 12, side shields 13, hopper 14, sprocket chain 15, sprocket 16, sprocket chain 17, sprockets 18, shaft 18a, drive sprocket 18b, elevator guide beams 19 and 20, adjusting rods 21, adjusting wheel 22, material cleaner and shifter wheels 23 and 24, large sprocket wheels 25, and bucket trains 26, 27 and 28, constitute the principal parts and portions of my material handling apparatus.

The main frame members 1 and 2 are preferably channel beams which extend longitudinally and form the main frame of the apparatus. These members 1 and 2 are rigidly supported on the axles, which are supported on the wheels 7 in any conventional manner.

It will be noted that these members 1 and 2 extend forwardly some distance in front of the front wheels, as shown best in Figs. 1 and 2 of the drawings, thus providing supports for the pickup and elevating apparatus. Secured on the front ends of the members 1 and 2, in an angular position, as shown best in Figs. 1 and 2 of the drawings, are the channel frame members 19 and 20, which extend upwardly and downwardly on an angle relative to the front end of the members 1 and 2. Shiftably mounted in the channel members 19 and 20 at their lower ends are journals 23a, which are adapted to support a shaft 23b, which extends through these members 19 and 20 and is adapted to move longitudinally therewith by reason of slots 19a and 20a in the members 19 and 20.

Secured on the shaft 23b in spaced relation to each other are four sprocket wheels 25. Mounted on these sprocket wheels 25 and on similar sprockets 18, positioned near the upper ends of the members 19 and 20, are the bucket trains 26, 27 and 28. It will be noted that these bucket trains 26, 27 and 28 are mounted on the four chains. The two chains near the middle are provided with extending lugs on opposite sides, to which are secured the inner sides of the buckets on the conveyers 26 and 28, and the buckets 27 are longer and extend across both sets of lugs, as shown best in Figs. 4 and 5 of the drawings. Thus, it will be noted that the middle row of buckets overlap the inner ends of the two outer rows of buckets, thus providing for complete pickup of the material from the winrow or from the ground, the inner row of buckets being in staggered relation to the outer one on the two middle chains, it being noted that the sprockets at the upper end are smaller than the ones at the lower end of the conveyers.

The sprockets 18 are supported on a shaft 18a, and this shaft 18a is journaled in journals 18b in the channel bars 19 and 20, the channel bars 19 and 20 being provided with slots 19b and 20b near their upper ends to permit the reciprocal movement of the shaft 18a therein. These journal members 23a and 18b are positioned near the opposite end of each of the channels 19 and 20 and supported in position in the channels by means of rods 21, which are secured to the journal members and provided with lock nuts on opposite sides for adjusting relative positions of the journal members to each other. These rods 21 are supported at the upper ends of the channel members 19 and 20 by means of an internally threaded member 21a to which is secured a hand wheel 22, thus providing means for supporting and adjusting and raising the journal members together with the bucket conveyers 26, 27 and 28 on the channel members 19 and 20. The upper ends of the members 19 and 20 are supported by means of a pair of braces 19c and 20c, which are secured to the upper ends of the members 19 and 20 and secured to the members 1 and 2 intermediate their ends at approximately the center of the frame between the supporting wheels 7. Secured on these braces 19c and 20c are journals in which is revolubly mounted the shaft 16a, upon the one end of which are mounted the sprocket wheels 16, which carry the chains 17, which chains are also mounted on the sprocket wheels 18c, thus providing means for operating the bucket trains 26, 27 and 28.

It will be noted that the shaft 16 is the main shaft which is positioned transversely across the frame of the apparatus and is operated by the engine 8, as will be hereinafter described.

Secured to the main frame members 1 and 2 near their front ends are the members 3 and 4 by means of plates 3a, and the extended ends of these members 3 and 4 are supported by means of struts 5 and 6. Secured to the upper ends of these struts 5 and 6 is the hopper 14, which is preferably a metallic hopper, preferably of a size to hold about two yards of material, which is provided with a sliding door on the lower side adapted to empty the contents thereof into wagons, trucks and the like.

Mounted on the frame members 3 and 4 at the middle is a conveyer 12, which is a conventional belt conveyer operated from the upper end by means of a chain 15 on sprockets 12a on a shaft 12b, which is the main driveshaft for the conveyer 12, the supports for the conveyer being secured in any conventional manner on crossbars 3b extending from the members 3 to 4, the upper end of the belt conveyer being positioned over the upper side of the hopper 14.

The apparatus is operated by an engine 8 through several interconnected transmissions 8a, 8b and 8c, which operates the shaft 16a and also operates the driveshaft for the traction wheels 7 through shafts 10 and 11 through a transmission 8c, all being of the conventional type.

The operation of the apparatus is as follows:

When it is desired to pick up material from a winrow, the apparatus is positioned longitudinally over the winrow with the wheels 23 and 24 on opposite sides thereof, and the apparatus driven through the wheels 7 by means of the engine 8, transmissions 8a, 8b and 8c and shafts 10 and 11 to the front and rear wheels 7 of the apparatus, thus moving the apparatus along the winrow at the same time the shaft 16a revolves, operating the conveyer 12 and at the same time operating the bucket trains 26, 27 and 28, which are bucket conveyers adapted to pick up the dirt and run the material from the winrow and carry it by means of the three rows of buckets upwardly and dump it into a pan 12c, which pan conducts it to the conveyer 12 where it is conveyed upwardly and backwardly and dumped into the hopper 14. The wheels 23 and 24 have members 23a and 24a which tend to move the material inwardly toward the center of the winrow and also clean the trackway for the wheels 7. In case the apparatus gets into soft dirt and requires more traction and support, it will be noted that these wheels are provided with extended portions 7a provided with lugs 7b, which serve as traction plates for said wheels.

When it is desired to move the apparatus from place to place, the hand wheel 22 is revolved, which raises the wheels 23 and conveyers 26, 27 and 28 upwardly to the desired height so that they clear any obstructions which might be in the roadway if moving the apparatus from place to place. When operating on the winrow the apparatus moves along and the material is conducted upwardly in the buckets, dumped over the plate 12c into the conveyer 12 and thence to the hopper 14. The apparatus progresses steadily in a forward direction while the conveyor buckets are in operation, the loads being conveyed to the hopper 14 which may be emptied from time to time into wagons or trucks without hindering or delaying the normal operation of the apparatus.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a material handling apparatus for removing loosened materials, a self-propelled carriage, a plurality of rows of bucket diggers and conveyers positioned side by side on the front end of said carriage, the ends of the buckets in the different rows overlapping each other, and wheels provided with angular plates on their periphery revolubly mounted with said conveyers and on the opposite sides thereof.

2. In a material handling apparatus for removing loosened material, a self-propelled carriage, a plurality of rows of bucket conveyers positioned side by side on the front end of said carriage, the ends of the buckets in the different rows overlapping each other, and wheels provided with angular plates for shifting dirt inwardly revolubly mounted with said conveyers on the opposite sides thereof, said conveyers and wheels propelled by the propeller for said carriage.

3. In a material handling apparatus for removing loosened material, a self-propelled carriage, a plurality of rows of bucket conveyers positioned side by side on the front end of said carriage, the ends of the buckets in the different rows overlapping each other, wheels provided with angular plates for shifting dirt inwardly revolubly mounted with said conveyers on the opposite sides thereof, and means for raising and lowering said conveyers and wheels relative to said carriage.

4. In a material handling apparatus for removing loosened material, a self-propelled carriage, a plurality of endless elevator conveyers positioned on the front end thereof, and a pair of broad rimmed material moving wheels positioned on opposite sides of said conveyers at the front end thereof and radially extending plates on said rims at an angle to the axis of said wheels for directing said material inwardly.

5. In a material handling apparatus for removing loosened material, a self-propelled carriage, a plurality of elevator conveyers positioned on the front end thereof, a pair of broad rimmed material moving wheels positioned on opposite sides of said conveyers at the front end thereof radially extending plates on said rims for shifting material inwardly on rotation of said wheels, and unitary means for operating said elevator, conveyers and wheels.

6. In a material handling apparatus, for removing loosened material, a self-propelled carriage, a plurality of elevator conveyers positioned on the front end thereof, a pair of broad rimmed material moving wheels positioned on opposite sides of said conveyers at the front end thereof radially extending plates on said rims for shifting material inwardly on rotation of said wheels, unitary means for operating said elevator conveyers and wheels, and means for adjusting the height of said elevator conveyers and wheels relative to said carriage.

7. In a material handling apparatus, a self propelled carriage including front and rear wheels in substantial alinement, a plurality of elevator conveyers positioned on the front end of said carriage and a pair of broad rimmed, material moving wheels positioned on opposite sides of said conveyer at the front end thereof and in substantial alinement with said carriage wheels, and adapted to shift dirt inwardly and clear paths for said carriage wheels.

8. In a material handling apparatus, a self propelled carriage including front and rear wheels said wheels having a relatively broad smooth resilient rim portion and extended rim portions supporting traction plates on their periphery, elevator conveyer means positioned on the front end of said carriage and a pair of material moving wheels operable with said conveyer means and positioned in substantial alinement with said carriage wheels, and adapted to shift dirt inwardly and clear a path for said carriage wheels.

9. In a material handling apparatus for removing loosened material, a carriage, a plurality of endless elevator bucket trains operatively positioned in the front end thereof side by side, the buckets of adjacent trains being positioned in overlapping, offset relation, and common means for supporting the overlapping ends of adjacent bucket trains and means for shifting said trains bodily in the direction of their longitudinal axis.

In testimony whereof, I have hereunto set my hand at San Diego, California, this 13th day of November, 1926.

FOSTER M. McCLURE.